(12) United States Patent
Shepard (10) Patent No.: US 9,959,344 B1
(45) Date of Patent: May 1, 2018

(54) SYSTEMS AND METHODS FOR PLAYING MULTIPLE SOUNDS

(71) Applicant: AMAZON TECHNOLOGIES, INC., Reno, NV (US)

(72) Inventor: Isaac Jeremy Shepard, Ladera Ranch, CA (US)

(73) Assignee: Amazon Technologies, Inc, Reno, NV (US)

( * ) Notice: Subject to any disclaimer, the term of this patent is extended or adjusted under 35 U.S.C. 154(b) by 254 days.

(21) Appl. No.: 14/460,109

(22) Filed: Aug. 14, 2014

(51) Int. Cl.
*G06F 17/00* (2006.01)
*G06F 17/30* (2006.01)

(52) U.S. Cl.
CPC . *G06F 17/30778* (2013.01); *G10H 2240/145* (2013.01)

(58) Field of Classification Search
CPC .............. G06F 17/30778; G06F 3/16; G10H 2240/145; G10H 2240/171; G10H 2240/201; G10H 2240/325
See application file for complete search history.

(56) References Cited

U.S. PATENT DOCUMENTS

2011/0060434 A1* 3/2011 Bowler .................. A63F 13/00
700/94

* cited by examiner

*Primary Examiner* — Fan Tsang
*Assistant Examiner* — David Siegel
(74) *Attorney, Agent, or Firm* — Robert C. Kowert; Meyertons, Hood, Kivlin, Kowert & Goetzel, P.C.

(57) ABSTRACT

Disclosed are systems, methods and devices for improving audio processing and playing multiple sounds using fewer resources. Various implementations may create audio files, in some cases from a single sample of a type of sound, where the files represent specific quantities of that type of sound, such as 10 footsteps or 1000 claps. Given a desired target number of sounds to play, various implementations determine an appropriate combination of the employable audio files to represent the desired number of sounds, and play or render the combination as an approximation of the desired target number of sounds. By using single audio files that represent and sound like multiple instances of a specified type of sound, the various implementations use significantly fewer computing and audio resources than playing an equivalent number of audio files each of which contains a single instance of the specified type of sound.

19 Claims, 5 Drawing Sheets

SYSTEMS AND METHODS FOR PLAYING MULTIPLE SOUNDS

BACKGROUND

In a computer application environment, each sound produced, for example by a user or the application, may be represented by a sound event or an audio stream or the like. A conventional technique for an application to produce multiple sounds at the same time is to individually and simultaneously play an audio file for each of the multiple sound events in separate "audio processing channels," (e.g., input feeds or voices), where a limited number of audio processing channels are provided by the underlying computing system's audio hardware resources and audio software resources.

This conventional technique requires that the application load all of the audio files that are to be played at the same time (e.g., one for each sound event), into memory for use by the computing system's audio hardware and software resources, which mixes them into a fixed number of audio output channels (e.g., two output channels for stereo) and produces an analog signal for playing by the loudspeaker(s) without noticeable delay. The audio hardware and software of most computing systems provide several audio processing channel resources that can handle several play requests at a time, for example, on the order of 32, 64, or 128 audio processing channels that can play a similar number of simultaneous audio play requests. Thus, there are technical limitations on the number of audio files or sounds that can be played at the same time without changing the basic hardware resources and/or audio software resources of the underlying computing system.

For some applications that have large numbers of simultaneous users, however, such as large multi-player games (e.g., massively multiplayer online (MMO) games), there is a need to play a large number of sounds at the same time. Because of sound-generating actions performed by the many users (e.g., game players), such an application may require several hundreds, thousands, tens of thousands, or more audio events to be played simultaneously, and conventional hardware, audio software, and processing power resources cannot meet such an application's demands.

To cope, most conventional computing systems and audio subsystems are designed to drop sound-play requests according to a priority scheme when the maximum limit of simultaneous requests is exceeded. For example, if a computing system has audio processing channel resources that can play no more than 32 simultaneous sounds, then a request to play a 33$^{rd}$ sound while all 32 audio processing channels are busy will cause the system to identify the priority level associated with each of the 33 sounds and drop the lowest priority sound—i.e., not play the lowest priority sound or stop playing it, if it is already playing.

This causes undesirable effects. When the audio processing channels are full, a new request to play an audio file or sound will either not be played because it has a lower priority than all of the sounds in the channels that are being played already, or the system will abruptly stop a lower priority audio file that is currently being played, remove it from its audio processing channel, and place the new, higher-priority audio file into the freed audio processing channel and start it playing. This type of abrupt stop and switch is undesirably noticeable to listeners. This is particularly undesirable if the playing audio file that is stopped and preempted by a higher priority audio file contains background music, which the user is accustomed to hearing uninterrupted while using an application such as an MMO game.

BRIEF DESCRIPTION OF THE DRAWINGS

The accompanying drawings, which are incorporated in and constitute a part of this specification, illustrate embodiments consistent with the invention and together with the description, serve to explain the principles of the invention. In the figures.

DETAILED DESCRIPTION

Reference will now be made in detail to various examples and embodiments of the invention, some of which are illustrated in the accompanying drawings. Wherever convenient, the same reference numbers will be used throughout the drawings to refer to the same or like parts.

Various implementations consistent with this disclosure play a desired number of sounds of the same type (e.g., 500 claps or 2,161 footsteps) by selecting and simultaneously playing a combination or group of sound files, each of which represents a quantity of sounds of the desired type and which together equal or approximate the desired number of sounds, at least within some tolerance range. For example, to produce the sound of 500 claps, instead of simultaneously playing 500 audio files each containing the sound of one clap, an implementation consistent with this disclosure may play five audio files simultaneously, each containing the sound of 100 claps, which together represent the sound of the desired 500 claps.

Such implementations have the advantage of requiring and using far fewer resources, such as audio processing channels, than conventional systems. In this example, a conventional system would need 500 audio processing channels to simultaneously play the 500 audio files each containing the sound of one clap, while the implementation consistent with this disclosure requires only five audio processing channels to simultaneously play the five 100-clap audio files. Thus, implementations consistent with this disclosure make it possible for applications that have a large number of users, each of which may generate multiple sound events at any particular time, to perform satisfactorily on conventional computing systems having limited computing and audio resources. For example, a massively multi-player online game that supports thousands of players, each generating perhaps hundreds of sound events per minute, may be run on a computing system that provides only 32 or 64 audio processing channels, yet still produce the appropriate portrayal of hundreds or thousands of sounds of a particular type, such as claps or footsteps.

Various implementations consistent with this disclosure may use a single-event sound effect or sound sample, such as an audio file containing a recording of the sound of a single clap or of a single footstep, to create one or more new audio files that represent a specific quantity of instances of the sound, such as 10 claps or 100 footsteps. Other implementations may use multiple-event sound samples, such as an audio file containing a recording of the sound of five people clapping or of 50 footsteps, to mix and generate new audio files representing greater quantities.

Figure 1:
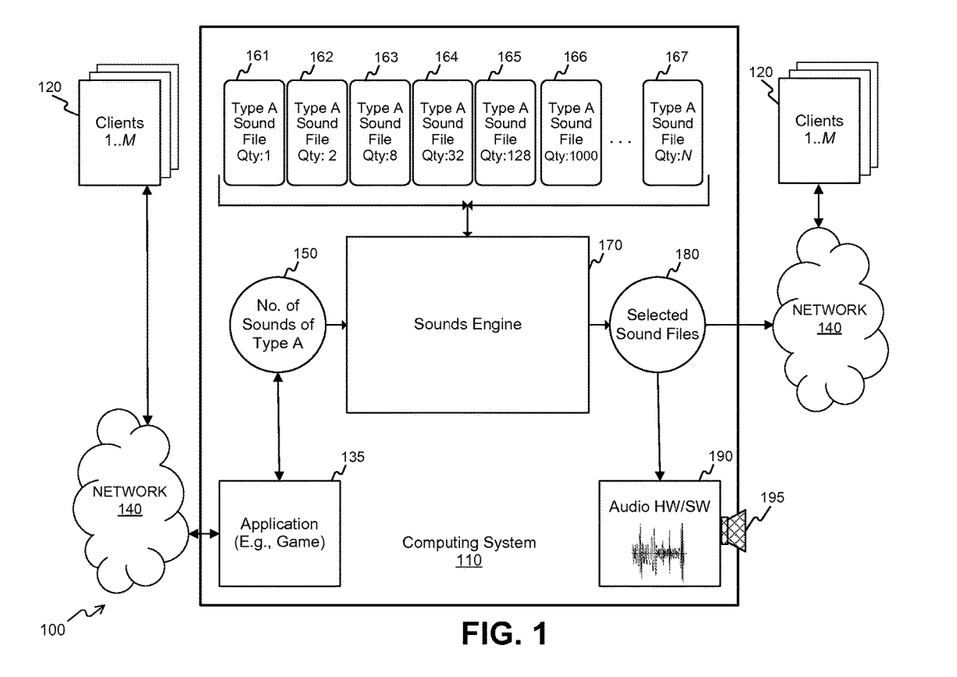
FIG. 1 is a block diagram of an example of a system for playing multiple sounds, consistent with the principles of the invention.

FIG. 1 is a block diagram of an example of a system 100 for playing multiple sounds while conserving resources, consistent with the principles of the invention. In the implementation shown, a sounds engine 170 is hosted on a computing system 110. In various embodiments, the sounds engine 170 may be implemented as a software application or program that runs on the computing system 110. In other embodiments, the sounds engine 170 may be implemented in hardware, or a combination of hardware and software. In some implementations, the computing system 110 may be a computing device such as a desktop, laptop or tablet computer or a smartphone, while in other implementations, the computing system 110 may be implemented as a server, such an MMO game server or online application server. In the example shown, the computing system 110 includes audio hardware and software 190, which may produce sounds that are audible to a person via a speaker 195. In some implementations, the audio hardware and software 190 may include a common intermediary audio platform that interfaces between applications, such as an application 135, and the system's hardware that produces audible sound, such as the speaker 195 and its associated sound board, amplifiers, digital-to-analog converters, etc. One example of such an intermediary audio platform is the FMOD™ product made by the Firelight Technologies™ company of Melbourne, Australia.

The sounds engine 170 obtains, receives, or otherwise employs as inputs data representing the desired (or in some implementations, required) number of sounds of Type A 150 and a set of Type A sound files 161-167. In this example, "Type A" may refer to any specified type of sound that may be employed by an application (e.g., the application 135) that is running on the computing system 110, such as a clap or clapping type of sound, a footstep(s) type of sound, a cheer(s) type of sound, a jumping type of sound, a landing type of sound, a character-dying type of sound, a weapon-firing type of sound, etc.

In various implementations, the data representing the desired number of sounds of Type A 150 may include an integer indicating the number of instances of a specified type of sound (in this example, Type A) that the application 135 is attempting to output at a defined point in time, for example, 500 claps or 2,161 footsteps. For illustration, consider a case where the application 135 is an online footrace game where "Type A" sounds are footstep sounds, and there are 10,000 people playing the footrace game using clients 1 . . . M 120, which are connected to the game application 135 via a network 140, such as the Internet. In various embodiments, M may be any positive integer number, and in this case M is 10,000.

Using, for example, a game update loop that repeats every 200 milliseconds, the game application 135 may detect and count how many footstep sounds (i.e., Type A sounds in this example) were requested or initiated by the clients 1 . . . M 120 during the last 200 milliseconds, such as 2,161 footstep sounds caused by 2,161 players' characters finishing a stride such that one of their feet hit the ground during that game update loop. For instance, game application 135 may receive 2,161 footstep sound events from 2,161 of the clients 120, which contain data indicating that each of those 2,161 clients 120 are requesting the playing of a footstep sound. The game application 135 may then send input data representing the desired number of sounds of Type A (e.g., footsteps) 150 to the sounds engine 170 for processing to produce the desired audible representation of the sound of 2,161 feet hitting the ground.

In various embodiments, the set of Type A sound files 161-167 that are used or employed by the sounds engine 170 may be implemented as software objects that each include both an audio file (e.g., a Waveform Audio File Format (WAV) file, a Windows Media Audio (WMA) file, an MPEG-2 Audio Layer III (MP3) file, or the like) that when played produces an audio representation of a specific quantity of sounds of Type A and metadata describing the quantity of sounds that the audio file represents. In various embodiments, the audio file is pre-rendered; i.e., created well before it is needed by the sounds engine 170. In addition to quantity information, the metadata may also contain additional information about the audio file, in some implementations. Continuing the previous example where "Type A" sounds are footstep sounds, sound file 161 contains an audio file of the sound of one footstep and metadata indicating the quantity of one footstep; sound file 162 contains an audio file of the sound of two footsteps and metadata indicating the quantity of two footsteps; sound file 163 contains an audio file of the sound of eight footsteps and metadata indicating the quantity of eight; and so on up to sound file 167, which contains an audio file of the sound of N footsteps and metadata indicating the quantity of N, where N may be any positive integer.

According to various implementations, in order to create an audible representation of the number of sounds specified by the input 150, the sounds engine 170 selects, chooses or otherwise determines one or more selected sound files 180 to use or employ from among the set of Type A sound files 161-167 and causes the selected sound file(s) 180 to be played by, for example, the audio hardware and software 190 and the speaker 195. In various implementations, the sounds engine 170 may select or produce a group of selected sound files 180 from the set of Type A sound files 161-167 having a sum of quantities that approximates the number of sounds specified by the input 150. In some implementations, approximating may include exactly equaling. In various implementations, the sounds engine 170 may include the same sound file more than once (e.g., include copies) in the group of selected sound files 180.

Continuing the previous example where the input data 150 indicates a desired number of 2,161 footstep sounds, the sounds engine 170 may select from among the set of Type A sound files 161-167 to create a group of selected sound files 180 consisting of two copies or instances of the sound file 166, each containing the sounds of 1000 footsteps, one copy or instance of the sound file 165, which contains the sounds of 128 footsteps, one copy of the sound file 164, which contains the sounds of 32 footsteps, and one copy of the sound file 161, which contains the sounds of 1 footstep. In some embodiments, the sounds engine 170 may determine which among the sound files 161-167 to use so as to make the sum of the quantities (e.g., 1000+1000+128+32+1) for the selected audio files in the group equal, or approximately equal, to the desired number of sounds specified by the input data 150 (e.g., 2,161). In some embodiments, the sounds engine 170 may employ a tolerance to approximate the desired number of sounds (e.g., plus or minus 50, plus or minus 10%, up to minus 15%, etc.) or an audio processing channel limit (e.g., 16) to determine whether the selected sound files 180 approximate the desired number of sounds specified by the input data 150.

In the current example, the sounds engine 170 has created a group of five selected sound files 180 (i.e., a 1000 footsteps sound file, another 1000 footsteps sound file, a 128 footsteps sound file, a 32 footsteps sound file, and a 1 footstep sound file) to represent the sound of 2,161 footsteps. Thus, the audio hardware and software 190 need play only five audio files simultaneously, or nearly simultaneously, to produce the sound of 2,161 footsteps via, for example, five audio processing channels playing simultaneously through the speaker 195. Accordingly, the system 100 uses far fewer audio hardware and software resources than a conventional system that attempts to play 2,161 single footstep audio files simultaneously. Moreover, it is likely impossible to play 2,161 single footstep audio files simultaneously in a conventional system due to the limited number of audio resources available, such as audio processing channel resources. A conventional system may have somewhere on the order of 16-128 separate audio processing channels (e.g., voices), necessitating that such a conventional system cannot play all 2,161 single footstep audio files simultaneously, but instead will play a small subset of the audio files as limited by the available audio hardware and software resources.

In various implementations described herein, the audio files may be played simultaneously or near simultaneously so as to approximate the sounds occurring simultaneously.

As shown in FIG. 1, in some implementations, the sounds engine 170 may additionally or alternatively stream or transmit the selected sound files 180, or the audio files from the selected sound files 180, or a representative live audio stream, to the clients 1 . . . M 120 via the network 140. In such implementations, the computing system 110 may be a server (such as an MMO game server) that generates an audio output (e.g., audio files or a live audio stream) that is transmitted to the clients 1 . . . M 120 (such as the computer of each player), which play the audio output via their own speakers (not shown). In some such implementations, each of the clients 120 may play its own user's sounds independently, added to the audio output from the server computing system 110, which supplies the sounds from all the other users of the application 135.

One of ordinary skill will recognize that the components and implementation details of system 100 are simplified examples presented for conciseness and clarity of explanation. Other components, implementation details and variations may be used. For example, the sounds engine 170 may be implemented as part of the application 135, instead of separately as shown. For another example, in addition to the set of Type A sound files 161-167, there may be one or more additional sets of sound files of different types, each representing different sounds that are used or employed by the application 135, such as clapping, cheering, whistling, landing, falling, dying, firing, etc. types of sounds. For yet another example, each of the sound files 161-167 may have any amount of metadata associated with them in addition to the metadata specifying the quantity of sounds represented in the associated audio file, such as metadata that specifies how the associated audio file was created—e.g., metadata specifying variations in gain, pitch, reverb, etc. that were employed to create larger quantity sounds from single sound samples or to create variations of a single type of sound, such as 1,000 footsteps on open pavement, 1,000 footsteps occurring under a bridge, (which contain more reverb effect), 1,000 footsteps occurring in a stadium (which contain more echo effect), and the like.

For still another example, system 100 may omit connections to the network 140 and the clients 120 in architectures where a user of the application 135 and the computing system 100 does not interact with other users, but instead interacts only with the application 135. For instance, the application 135 may be a game where the user plays with and against multiple non-player characters (NPCs), which are controlled by the application program 135, not by other humans.

Figure 2:
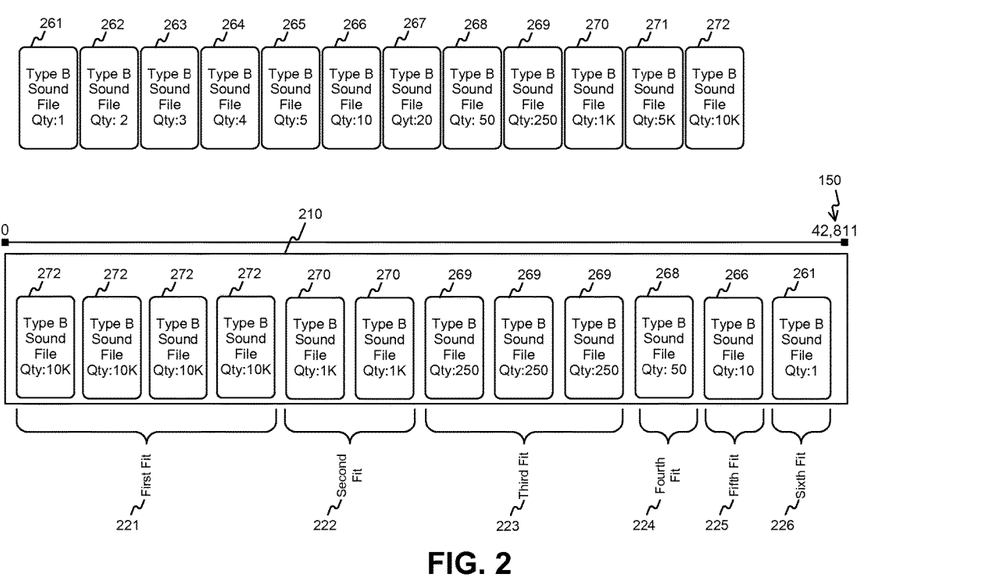
FIG. 2 is a diagram illustrating an example of a technique for selecting or choosing sound files to play, consistent with the principles of the invention.

FIG. 2 is a diagram illustrating an example of a technique for selecting, choosing, or otherwise determining sound files to play, consistent with the principles of the invention. In some embodiments, the technique of FIG. 2 may be implemented by the sounds engine 170 of FIG. 1 to produce a group 210 of sound files, which is an example of the selected sound files 180 of FIG. 1. In various implementations, the sounds engine 170 may employ variations of heuristics typically used to solve the computer-science bin packing problem (such as, for example, a first-fit algorithm) in order to select, choose, or otherwise determine the selected sound files 180 (e.g., the group 210) used to represent a desired or required number of sounds 150.

In the example illustrated in FIG. 2, the sounds engine 170 has available or employable a set of Type B sound files 261-272. Sound file 261 includes an audio file with digital data that when played sounds like one instance of a sound of Type B and metadata indicating a quantity of one. Sound file 262 includes an audio file with digital data that when played sounds like two instances of a sound of Type B and metadata indicating a quantity of two. Sound file 263 includes an audio file with digital data that when played sounds like three instances of a sound of Type B and metadata indicating a quantity of three. Sound files 264-272 are similar, with audio files and quantity metadata for quantities of four, five, 10, 20, 50, 250, 1,000, 5,000, and 10,000, respectively. Thus, in an exemplary case where a sound of Type B is the sound of a clap, the sound file 269 includes an audio file with digital data that when played sounds like 250 claps and metadata indicating a quantity of 250 claps.

In the example shown in FIG. 2, the desired (e.g., target) number of sounds of Type B 150 that the sounds engine 170 is tasked with playing is 42,811 (e.g., 42,811 claps). In various embodiments, the sounds engine 170 may employ a first-fit algorithm to select or determine which sound files from the set of Type B sound files 261-272 to play in order to represent or approximate 42,811 sounds of that type. More specifically, by employing an ordered-by-quantity set of Type B sound files 261-272 as illustrated in FIG. 2, the sounds engine 170 may employ a first-fit-decreasing algorithm to select or determine which sound files to play in order to represent 42,811 sounds of that type.

To illustrate the operation of one example of a first-fit-decreasing algorithm implementation, consider further the case where the sound of Type B is the sound of a clap, and each file in the set of Type B sound files 261-272 represents the indicated quantity of claps. In this example, the sounds engine 170 starts with the largest quantity sound file and subtracts as many positive integer multiples of that quantity as possible that "fit" into the target number of sounds 150. The positive integer is the number of copies or instances of that sound file that is selected for inclusion in the output sound files 180 (e.g., group 210 in FIG. 2) of the sounds engine 170. Then, the sounds engine 170 proceeds in a decreasing-quantity direction through the sound files 261-272 to the next largest quantity sound file and repeats performing as many whole integer subtractions as possible from the remainder. This subprocess is repeated while the remainder is positive and until the remainder is zero or until the remainder is a number that is smaller than the smallest quantity sound file.

Thus, in the example of FIG. 2, during the first fit pass 221, the sounds engine 170 subtracts 10,000 from 42,811, leaving a remainder of 32,811, and chooses or selects one copy of the 10K sound file 272, which is placed into the group 210 of selected sound files (e.g., the selected sound files 180 in FIG. 1) as illustrated with respect to the first fit 221. Then the sounds engine 170 subtracts 10,000 from 32,811, leaving a remainder of 22,811 and places another selected copy of the 10K sound file 272 into the group 210 of selected sound files as illustrated with respect to the first fit 221. Then the sounds engine 170 subtracts 10,000 from 22,811, leaving a remainder of 12,811, and again selects a third copy of the 10K sound file 272 for placement into the group 210 of selected sound files as illustrated with respect to the first fit 221. Finally, the sounds engine 170 subtracts 10,000 from 12,811, leaving a remainder of 2,811, and places a fourth copy of the 10K sound file 272 into the group 210 of selected sound files as illustrated with respect to the first fit 221. Because the sounds engine cannot subtract 10,000 from 2,811, the first fit 221 has been completed.

The sounds engine 170 then attempts to subtract the next smallest quantity, in this case 5K as specified in the sound file 271, from the remainder of 2,811. Because this cannot be done to produce a positive remainder, as 5,000 is larger than 2,811, no sound file 271 is selected for inclusion in the group 210 and this is not considered to be a fitting pass.

In the second fit 222, the sounds engine 170 attempts to subtract the next smallest quantity, in this case 1K as specified in the sound file 270, from the remainder of 2,811. This quantity fits into the remainder as the subtraction produces a new positive remainder of 1,811, and the sounds engine 170 selects and places a copy of the 1K sound file 270 into the group 210 of selected sound files as shown with respect to the second fit 222. The sounds engine 170 again attempts to subtract the quantity 1K from the new remainder of 1,811. This quantity again fits into the remainder as the subtraction produces a new positive remainder of 811, and the sounds engine 170 places a copy of the 1K sound file 270 into the group 210 of selected sound files as shown with respect to the second fit 222. Because 1K cannot fit into the new remainder of 811, the second fit 222 ends.

In the third fit 223, the sounds engine 170 selects the next smallest quantity, in this case 250 as specified in the sound file 269, and attempts to subtract this quantity from the remainder of 811. This quantity fits into the remainder as the subtraction produces a new positive remainder of 561, and the sounds engine 170 places a first copy of the selected "quantity: 250" sound file 269 into the group 210 of selected sound files as shown with respect to the third fit 223. The sounds engine 170 again attempts to subtract the number 250 from the new remainder of 561. This number again fits into the remainder as the subtraction produces a new positive remainder of 311, and the sounds engine 170 places a second copy of the "quantity: 250" sound file 269 into the group 210 of selected sound files as shown with respect to the third fit 223. For the third time, the sounds engine 170 again attempts to subtract the quantity 250 from the new remainder of 311. This quantity again fits into the remainder as the subtraction produces a new positive remainder of 61, and the sounds engine 170 places a third copy of the "quantity: 250" sound file 269 into the group 210 of selected sound files as shown with respect to the third fit 223. Because 250 cannot fit into the new remainder of 61, the third fit 223 ends.

In the fourth fit 224, the sounds engine 170 selects the next smallest quantity, in this case 50 as specified in the sound file 268, and attempts to subtract it from the current remainder of 61. This quantity or number fits into the remainder as the subtraction produces a new positive remainder of 11, and the sounds engine 170 places a copy of the selected "quantity: 50" sound file 268 into the group 210 of selected sound files as shown with respect to the fourth fit 224. The sounds engine 170 again attempts to subtract the number 50 from the new remainder of 11, but cannot perform this subtraction to produce a positive remainder because 50 is greater than 11, and the fourth fit 224 ends.

The sounds engine 170 then attempts to subtract the next smallest quantity, in this case 20 as specified in the sound file 267, from the current remainder of 11. Because this cannot be done as 20 is larger than 11, this is not a fit and a "quantity: 20" sound file is not selected for the group 210.

In the fifth fit 225, the sounds engine 170 selects and attempts to subtract the next smallest quantity, in this case 10 as specified in the sound file 266, from the current remainder of 11. This quantity fits into the remainder as the subtraction produces a new positive remainder of 1, and the sounds engine 170 places a selected copy of the "quantity: 10" sound file 266 into the group 210 of selected sound files as shown with respect to the fifth fit 225. The sounds engine 170 again attempts to subtract the quantity 10 from the new remainder of 1, but cannot because 10 is greater than 1, and the fifth fit 225 ends.

After determining that the quantities five, four, three and two (as represented by the sound files 265, 264, 263, and 262) do not fit into the current remainder of 1, the sounds engine 170 selects and attempts to subtract the next smallest quantity, in this case 1 as specified in the sound file 261, from the current remainder of 1. This quantity fits into the remainder as the subtraction produces a remainder of 0, and the sounds engine 170 places a copy of the "quantity: 1" sound file 261 into the group 210 of selected sound files as shown with respect to the sixth fit 226. Because the remainder is now zero, the process ends and the group 210 of selected sound files is complete.

Thus in the this example, the system 100 may represent the desired target sound 150 of 42,811 claps by simultaneously playing the 12 audio files associated with the 12 sound files in the group 210 of selected sound files as shown in FIG. 2. Note that although the group 210 is described in this examples as containing more than one sound file, in some iterations it may contain only a single sound file—for example, if the desired number of sounds were 10,000 then the algorithm may select only the "quantity: 10K" Type B sound file 272 from the set of Type B sound files 261-272.

One of ordinary skill will recognize that the algorithm and processing described with respect to FIG. 2 is a simplified example presented for conciseness and clarity of explanation. Other subprocesses, implementation details and variations may be used. For example, the number of files in the group 210 of selected sound files may be limited by the number of audio processing channels available to play audio files. For instance, if there were eight audio processing channels available to play audio files, then the first-fit-decreasing algorithm or process may be implemented in a manner that stops when the number of selected files equals the number of available audio processing channels. Implemented in the example shown in FIG. 2, the algorithm may thus stop after two-thirds of the third fit 223 is completed, such that the group 210 would contain exactly eight files (e.g., four copies of the 10K sound file 272 from the first fit 221, two copies of the 1K sound file 270 from the second fit 222, and two copies of the "quantity 250" sound file 269 from first two passes of the third fit 223) resulting in one audio file selected to play for each of the eight available audio processing channels In this example, the system determines that the eight files summing to a quantity of 42,500 claps approximates the desired target sound 150 of 42,811 claps.

In another example of a variation of a first-fit-decreasing algorithm or process, the system 100 may cease selecting files for the group 210 when the sum or total of the quantities of the selected files is within a predetermined tolerance of the desired or target number of sounds 150. For instance, if the tolerance is plus-or-minus ten percent, then the processing described with respect to FIG. 2 may stop when the sum of the quantities in the group 210 is between 38,530 (i.e., 42,811−10%) and 47,092 (i.e., 42,811+10%). In the example shown in FIG. 2, this would occur when the group 210 contained the first four files (e.g., the four copies of the 10K sound file 272 from the first fit 221) because the sum of the quantities of these four files is 40,000, which falls within the tolerance range of 38,530 and 47,092. In this example, the system determines that the four files summing to a quantity of 40,000 claps approximates the desired target sound 150 of 42,811 claps.

Figure 3:
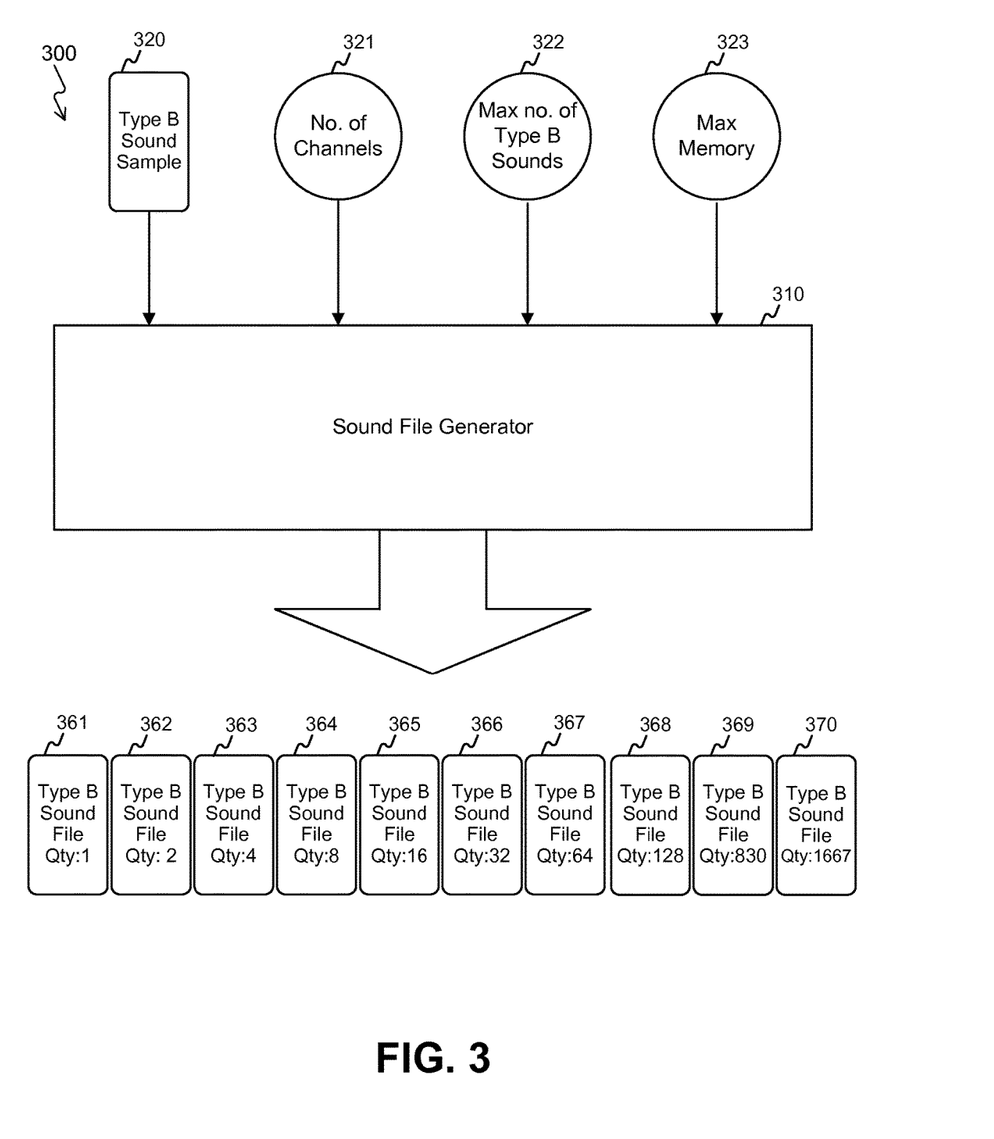
FIG. 3 is a diagram illustrating an example of a technique for generating sound files, consistent with the principles of the invention.

FIG. 3 is a diagram illustrating an example of a technique 300 for generating sound files, consistent with the principles of the invention. In some implementations, the technique of FIG. 3 may be implemented by the sounds engine 170 of FIG. 1 to produce the sound files 161-167 of FIG. 1. In some implementations, the sound file generator 310 can be a component of the sounds engine 170. Likewise, in some implementations, the sound file generator 310 can be a component that is separate from the sounds engine 170.

In various implementations, the sound file generator 310 can receive various inputs and constraints to generate sound files to be used by the sounds engine 170. As illustrated, the sound file generator 310 can receive the Type B sound sample 320. In this example, the Type B sound sample 320 is a single recording of the sound Type B, for example, as describe in FIG. 2, a single clap. In some implementations, the Type B sound sample 320 may be artificially generated instead of recorded, such as a computer-software-generated digital audio file that when played imitates the sound of a clap. The sound file generator 310 can also receive one or more constraints, for example, a constraint 321 of a number of audio processing channels, a constraint 322 of a maximum number of the Type B sounds, and a constraint 323 of a maximum amount of memory to be used by the sound files. The sound file generator 310 can utilize one or more of the constraints to determine the number of Type B sound files to create (e.g., the number of sound files in the set of sound files 361-370 or 161-167) and to determine how many instances of the Type B sound should be in each sound file (i.e., the quantity).

When generating the set of Type B sound files 361-370, a balance exists between the accuracy of the group 210 of selected sound files 180 that can be produced to represent the desired number of sounds 150 and the amount of resources available. One resource constraint can be the constraint 321 on the number of audio processing channels. For example, as the number of available simultaneous audio processing channels gets smaller, the number of Type B sound files needed to maintain the same amount of accuracy gets larger. Conversely, as the number of available simultaneous audio processing channels gets larger, the number of the Type B sound files needed to maintain the same amount of accuracy gets smaller.

For example, a computing system 110 utilizing the sounds engine 170 may include audio hardware/software (e.g., audio HW/SW 190) that supports or has available five audio processing channels, e.g., five simultaneous sounds being played, and thus five may be input as the number of channels 321. In addition, the application 135 may have a need for a maximum of 10,005 sounds of Type B, and thus 10,005 may be supplied to the sound file generator 310 as the input 322. In this example, having only a few Type B sound files in the set 361-370 (or the set 161 . . . 167 of FIG. 1) to choose from would decrease accuracy by making it impossible to exactly match or very nearly match some desired numbers of sounds 150. For instance, if the sound file generator 310 only generated two files: a Type B sound file with 1,000 claps and a Type B sound file with 5 claps, then the sound engine 170 would not be able to provide an accurate sound for 10,005 claps. That is, the sounds engine 170 would only be able to provide representation of 5,000 claps to the computing system with only five audio channels—namely in this example, five instances of the Type B sound file with 1,000 claps.

By using a larger and more varied set of sound files for this exemplary five-channel resource constraint, the sound file generator 310 can generate a set of Type B sound files with a 5 claps sound, a 1,000 claps sound, and a 5,000 claps sound, which would the allow the sounds engine 170 to represent or recreate 10,005 claps with three Type B sound files playing simultaneously (two instances of the Type B sound file with 5,000 claps and one instance of the Type B sound file with five claps). The principal of this example applies to accuracy in general in that more accuracy in the resulting sound for a given number of channels requires more sound files with differing quantities of the Type B sound.

As mentioned above, in various implementations, another constraint may be the constraint 322 on the maximum number of the Type B sounds. The constraint 322 can be based on the application and/or environment with which the Type B sound files will be used. The constraint 322 can provide an upper limit on the quantity of sounds to include in one of the Type B sound files. For example, if the Type B sound files are being used in a MMO game, the MMO game may only require as many Type B sounds at one time as the maximum number of players allowed in the game allow (e.g., 10,000 player characters and 10,000 non-player characters). In this example, the constraint 322 on the maximum number of the Type B sounds may be 20,000 clap sounds simultaneously.

In various implementations, another constraint can be the constraint 323 on the maximum memory available to or utilized by the Type B sound files. During operation, the sounds engine 170 requires a certain amount of storage space for operations and storage of the Type B sound files. The number of the Type B sound files and the size of each Type B sound file determine the amount of memory used by the sounds engine 170. The constraint 323 can provide an upper limit on the amount memory allowed to be utilized by the Type B sound files. The sound file generator 310 can utilizing the constraint 323 in determining the number of Type B sound files to create and the number or quantity of Type B sounds to put in each Type B sound file that is created.

In various implementations, the sound file generator 310 can utilize one or more of the constraints 321, 322, and 323 to determine the number of Type B sound files to create and the quantity of Type B sounds to put in each Type B sound file. The sound file generator 310 can determine the number of Type B sound files and the quantity of Type B sounds in each Type B sound file so that accuracy is maximized while meeting one or more of the constraints 321, 322, and 323. The sound file generator 310 can use any combination of the constraints 321, 322, and 323 to determine the number of Type B sound files to create and the quantity of Type B sounds in each Type B sound file.

For example, as illustrated in FIG. 3, the sound file generator 310 can determine the number of Type B sounds to include in the largest Type B sound file 370 by dividing the constraint 322 (e.g., a max of 10,000 Type B sounds) by the constraint 321 (e.g., six audio processing channels). In this example of a maximum of 10,000 simultaneous sounds and a maximum of six audio processing channels, the sound file generator 310 can determine a quantity of 1667 (rounded up) Type B sound to include in the Type B sound file 370 by dividing 10,000 by six. In this example, the sound file generator 310 can determine the number of the remaining Type B sound files by selecting quantities of the type be sounds so that a predetermined degree of accuracy can be provided. For example, the sound file generator 310 can determine to generate only two files with relatively large numbers of Type B sounds (e.g., Type B sound file 370 with a quantity of 1667 Type B sounds, Type B sound file 369 with a quantity of 830 (i.e., approximately one-half of 1667) Type B sounds), and generate eight sound files with smaller quantities of Type B sounds (Type B sound file 361 with one Type B sounds, Type B sound file 362 with two Type B sounds, Type B sound file 363 with four Type B sounds, Type B sound file 364 with eight Type B sounds, Type B sound file 365 with 16 Type B sounds, Type B sound file 366 with 32 Type B sounds, Type B sound file 367 with 64 Type B sounds, and Type B sound file 368 with 128 Type B sounds)—which in this example are powers of the number two.

In various implementations, once the number of Type B sound files and their representative quantities is determined, the sound file generator 310 can utilize the Type B sound sample 320 to generate a set of Type B sound files 361-370. The sound file generator 310 can play, mix, and record, simultaneously, multiple instances of the Type B sound sample 320 equal to the quantity of Type B sounds included in a Type B sound file. For example, when creating the Type B sound file 362, the sound file generator 310 can, simultaneously, play and mix two instances of the Type B sound sample 320 and record or generate the result as a digital audio file included in the Type B sound file 362. When combining multiple instances of a Type B sound sample 320, known audio mixing techniques may be used to vary the sample instances in timing, phase, pitch, amplitude, etc. to avoid unrealistic or undesirable combined results. For example, if several instances of the Type B sound sample 320 are played at exactly the same time (i.e., in phase) then undesirable distortion may occur because of phase amplification, which can cause clipping and undesirable amplitude in the resulting the Type B sound file audio. Likewise, if two Type B sound samples 320 are completely out of phase, phase cancellation may result in undesirable nullification (e.g., no sound) for the Type B sound file.

In some implementations, the sound file generator 310 can introduce gain and/or amplitude differences during playing one or more of the Type B sound sample(s) 320 and recording the Type B sound files 361-370. By introducing the gain and/or amplitude differences, the sound file generator 310 can cause variation in the volume of one or more of the Type B sound sample(s) 320 being played and the resulting sound file sounds more realistic. In one implementation, the sound file generator 310 can randomize, during playing, the volume of one or more of the Type B sound sample(s) 320 while recording the Type B sound files 361-370.

In some implementations, the sound file generator 310 can utilize offset differences during playing one or more of the Type B sound sample(s) 320, so that not all the sounds start at exactly the same time and the resulting audio file recording sounds more realistic. The sound file generator 310 can utilize an offset that is based on the environment in which the Type B sound files are used. Likewise, the sound file generator 310 can utilize an offset that is randomized. Additionally, the sound file generator 310 can utilize any type of offset effect. For example, the offset Type B sound sample can start in the middle of another Type B sample instantly, fade in, wait before starting, fade out, and the like.

In some implementations, the sound file generator 310 can utilize differences in stereo panning from one speaker to another during playing one or more of the Type B sound sample(s) 320. In some implementations, the sound file generator 310 can utilize panning and sound placement in various multi-channel output channels during playing one or more of the Type B sound sample(s) 320. In some implementations, the sound file generator 310 can utilize pitch-shifting techniques during playing one or more of the Type B sound sample(s) 320. In some implementations, the sound file generator 310 can vary the sample utilizing standard audio filters such as echo, reverb, fade, high pass filter, low pass filter, flange (e.g., an audio effect produced by mixing two identical signals together, one signal delayed by a small and gradually changing period, usually smaller than 20 milliseconds), and the like.

In various implementations, the sound file generator 310 may generate or pre-render the Type B sound files 361-370 before a Type B sound file 361-370 is needed by the sounds engine 170. For example, if the sound file generator 310 is being utilized for an MMO game application (e.g., application 135), the sound file generator 310 can generate the set of Type B sound files 361-370 at any time prior to the start of the game application.

In some implementations, the sound file generator 310 may generate the set of Type B sound files 361-370 during user breaks or pauses in the operation of an application. Continuing the above example, the sound file generator 310 can generate the set of Type B sound files 361-370, or a subset, during pauses in gameplay, such as between levels while an introductory screen is being displayed to the users. For instance, going into a new game level, the sound file generator 310 and/or the application 135 can determine that 500 players remain that are entering the level, and that a maximum of 500 Type B sounds may be required to play simultaneously. Based on this, the sound file generator 310 can generate the Type B sound files 361-370 necessary to satisfy the potential needs of those 500 players. Likewise, going into the level again during a different game play instantiation, the sound file generator 310 can determine that 800 players entering the level may require a maximum of 800 Type B sounds to play simultaneously, and the sound file generator 310 can generate a different set of Type B sound files 361-370 to satisfy the potential needs of those 800 players. In such implementations, by only generating the Type B sound files tailored to the current game players, the sound file generator 310 avoids using up memory and other resources unnecessarily.

In still other implementations, the sound file generator 310 may generate the set of Type B sound files 361-370 in real time during execution of the application 135. For example, if the current number of Type B sounds needed 322 (e.g., analogous to the input 150 of FIG. 1) during the current cycle of the update loop for the application 135 is 6,543, and the current number of available audio processing channels 321 is eight, then the sound file generator 310 may create a set of Type B sound files 361-368 the represents 6,543 Type B sounds using audio files, or less. Further, if during the next cycle of the update loop for the application 135 the current number of Type B sounds needed 322 changes to 4,111, then the sound file generator 310 may create a new set of Type B sound files 361-368 the represents 4,111 Type B sounds using audio files, or less. And so on for each application update loop in real time for the loop.

One of ordinary skill will recognize that the techniques and processing described with respect to FIG. 3 are simplified examples presented for conciseness and clarity of explanation. Other subprocesses, implementation details and variations may be used without departing from the principles of this disclosure. For example, some implementations of the sound file generator 310 may create a set of Type B sound files 361-370 having quantities equal to powers of the number two, for example, quantities of one ($2^0$), two ($2^1$), four ($2^2$), eight ($2^3$), 16 ($2^4$), 32 ($2^5$), 64 ($2^6$), 128 ($2^7$), 256 ($2^8$), 512 ($2^9$), etc. In such implementations, the sounds engine 170 may determine the group of selected sound files (e.g., 180 of FIG. 1 or 210 of FIG. 2) by using the sound files 361-370 whose quantities sum to the desired number of sounds 150, where the desired number of sounds is expressed as a binary number and the "1" digits in the binary number each corresponds to a specific file in the set of Type B sound files according to the place value of the "1" digit.

Figure 4:
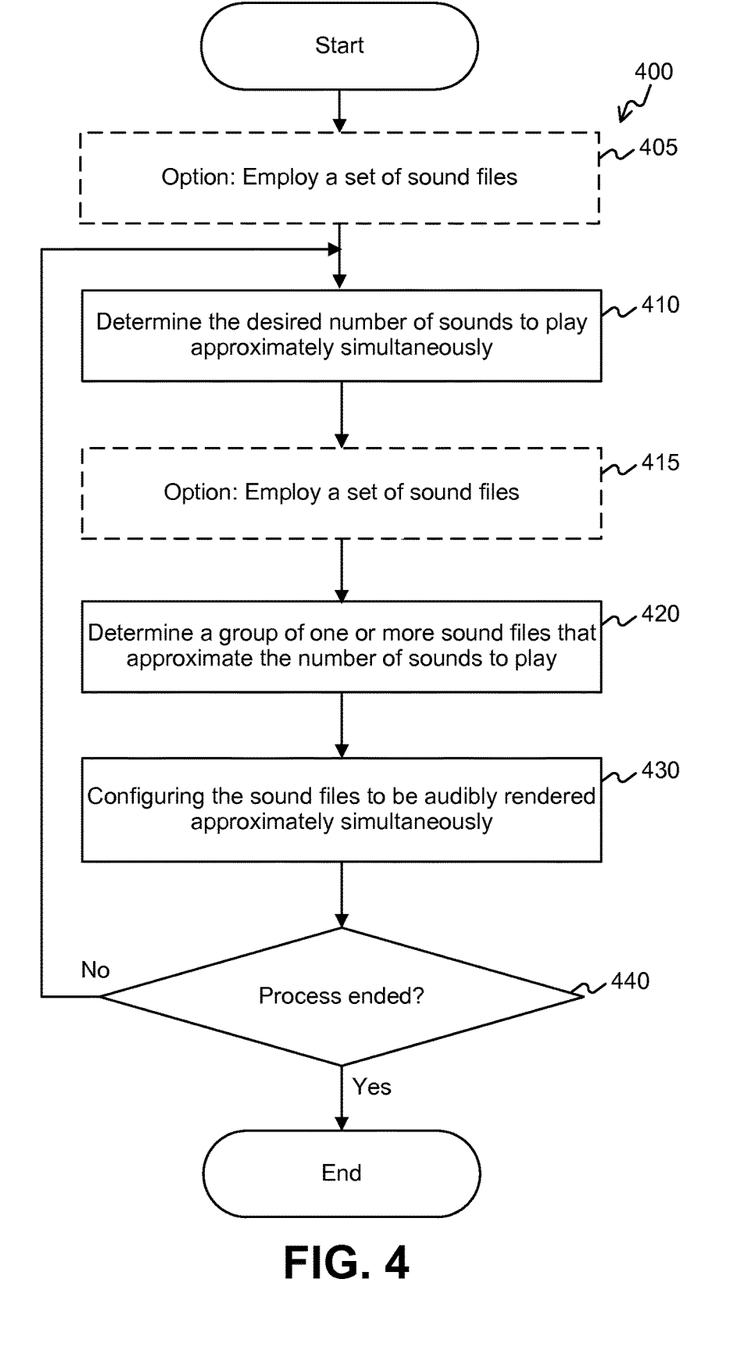
FIG. 4 is a flowchart of an example of a process for playing multiple sounds, consistent with the principles of the invention.

FIG. 4 is a flowchart of an example of a process 400 for playing multiple sounds, consistent with the principles of the invention. In various embodiments, process 400 may be implemented in software or firmware (e.g., a sounds engine 170 or an application 135) running on a local computing system, such as a laptop computer, a smartphone or the like. In some embodiments, process 300 may be implemented in software or firmware (e.g., a sounds engine 170 or an application 135) running on a server computing system, such as a web server, that hosts an online application used by multiple users or clients (e.g., an MMO application 135 for gaming).

As shown in the example of FIG. 4, process 400 begins by optionally performing stage 405, as indicated by the dashed lines outlining this stage. For implementations that include stage 405, process 400 generates, obtains, receives, or otherwise employs a set of sound files, so that the sound files are pre-rendered before they are needed by later stages of the process 400. The set of sound files may each include a playable audio file and metadata indicating a quantity of sounds represented by the audio file, for example, as described with respect to the sets of sound files 161-167 of FIG. 1, 261-272 of FIG. 2, or 361-370 of FIG. 3.

Next, at stage 410, process 400 determines the desired number of sounds to play approximately simultaneously. In various implementations, the number of sounds to play may be determined by reading, receiving, or otherwise obtaining input data that specifies the desired number of sounds, such as the "number of sounds of type A" input data 150 shown in FIG. 1. As noted with respect to FIG. 1, in some implementations an application 135 may specify, output or otherwise determine the number of sounds to play approximately simultaneously (e.g., 150) based on the actions, interactions, sound events, requests, data, or inputs received from the clients 120 or users that are using the application 135.

For example, consider the case where an application 135 employing process 400 is an audience-feedback application for a live television (TV) show, which gathers sound-generating inputs from a multitude of TV audience members who are simultaneously watching the live TV show. The audience-feedback application generates sounds corresponding to the gathered sound-generating inputs and these sounds can be heard in the studio hosting the live TV show and can also be heard by the TV audience members because the sounds from the studio are broadcast to them via their TVs. In such an audience-feedback application, the TV audience members may provide sound-generating inputs or data to process 400 by, for example, pressing specific buttons on their cable-box remote control, such as a "clap" button, a "cheer" button, or a "boo" button, where, for example, their cable boxes act as clients 120 in system 100 of FIG. 1 and transmit sound events or other data corresponding to the button presses to the application 135. In this exemplary case, stage 410 may determine the number of, for example, clapping sounds to play by counting the number of clap-button presses, may determine the number of cheering sounds to play by counting the number of cheer-button presses, and may determine the number of booing sounds to play by counting the number of boo-button presses.

For implementations that include optional stage 415, process 400 generates, obtains, receives, or otherwise employs a set of sound files, such that the files are rendered or created, in real time or near real time, just as they are needed by stage 420. As previously noted, the set of sound files may each include a playable audio file and metadata indicating a quantity of sounds represented by the audio file, for example, as described with respect to the sets of sound files 161-167 of FIG. 1, 261-272 of FIG. 2, or 361-370 of FIG. 3.

At stage 420, process 400 determines one or more sound files that approximate the number of sounds to play that was determined in stage 410. In this disclosure, the one or more sound files may be called a "group," with the understanding that the group may consist of only one sound file in some implementations or iterations. In various implementations that use or employ several pre-rendered sound files (e.g., the set of sound files 161-167 of FIG. 1, the set of sound files 261-272 of FIG. 2, or the set of sound files 361-370 of FIG. 3) that each represent a specified quantity of a specific sound type (e.g., 100 claps, 1000 cheers, 5000 boos, etc.), stage 420 may choose, select, identify or otherwise determine a group of sound files that, when audibly played, will sound like the number of sounds determined in stage 410, or in other words, will approximate the sound of the number of sounds determined in stage 410. In the examples shown in FIGS. 1 and 2, the selected sound files 180 and the group 210 of sound files, respectively, correspond to the group of one or more sound files determined by this stage.

Continuing the previous example of the audience-feedback application for a live TV show, if the number of sounds to play from stage 410 included 9,700 boos and the set of pre-rendered "boo" sound files consists of four files for the quantities 5,000, 15,000, 45,000, and 135,000, then stage 420 may determine that two of the 5,000 boos sound files is the best approximation of the desired or target number of 9,700 boos because 10,000 boos (i.e., the two 5,000 boos sound files played simultaneously) is the sum closest to 9,700 that can be made from the available set of 5,000, 15,000, 45,000, and 135,000 employable "boo" sound files.

Similarly, if the number of sounds to play from stage 410 included 107,111 cheers and the set of pre-rendered "cheer" sound files consists of four files for the quantities 5,000, 15,000, 45,000, and 135,000 cheers, then stage 420 may determine that two of the 45,000 cheer sound files and one 15,000 cheer sound file is the best approximation of the desired number of 107,111 cheers because 105,000 cheers (i.e., the two 45,000 cheer sound files and the one 15,000 cheer sound file played simultaneously) is the sum closest to 107,111 that can be made from the available set of 5,000, 15,000, 45,000, and 135,000 employable "cheer" sound files.

At stage 430, process 400 configures the group of sound files determined in the previous stage to be rendered approximately simultaneously. In various implementations, two or more sounds or audio files may be configured or considered to be played or audibly rendered approximately simultaneously if they start playing within about 200 milliseconds or less of each other, such as, for example, within 30 milliseconds of each other. In some implementations, the configuring in stage 430 may include supplying the group of one or more sound files to the audio software and hardware of the host computing system for playing via a speaker, such as the audio hardware and software 190 and speaker 195 of FIG. 1, or may include supplying the group of sound files to clients 120 of FIG. 1 via a network 140 for playing by each client 120. In some implementations, the configuring in stage 430 may include forming from the audio files associated with the group of sound files into an audio stream, by, for instance the computing system 110 of FIG. 1 and transmitting the audio stream via the network 140 for playing by each client 120. Other variations are possible.

With respect to the example of the audience-feedback application for a live TV show discussed above, a system implementing stage 430 may simultaneously play or audibly render the two 5,000 boos sound files, the two 45,000 cheer sound files and the one 15,000 cheer sound file via speakers in the studio hosting the live TV show, where the sounds will be heard by the studio audience and also picked up by the TV microphones and broadcast out the TV sets of the TV audience members. Thus, all the audience members will hear the boos and the cheers generated by the "boo" button and "cheer" button inputs from their cable-box remote controls, as a form of interactive TV with feedback.

At stage 440, process 400 determines whether it should end (stage 440, Yes) or loop back to stage 410 and repeat (stage 440, No). In various implementations, this loop provides a mechanism for the process to continue to create multiple sounds for each time period or time slice produced by each iteration through the loop. For example, if the loop executes every 100 milliseconds, then the stage 410 would determine the number of sounds to play based on sound-event inputs that occurred during the previous 100 milliseconds.

Although process 400 has been described in the context of an interactive TV show application, it may be applied to most any application that requires the generation of multiple sounds based on the inputs of multiple users or actors, including both human users and computer-controlled actors (e.g., NPCs), such as MMO game applications and the like.

One of ordinary skill will recognize that process 400 is presented for conciseness and clarity of explanation, and that stages may be added to, deleted from, reordered or modified within process 400 without departing from the principles of this disclosure. For example, the stage 405 may be present, while stage 415 is absent, from some implementations, and vice versa for other applications. For another example, both stages 405 and 415 may be absent from some implementations.

Figure 5:
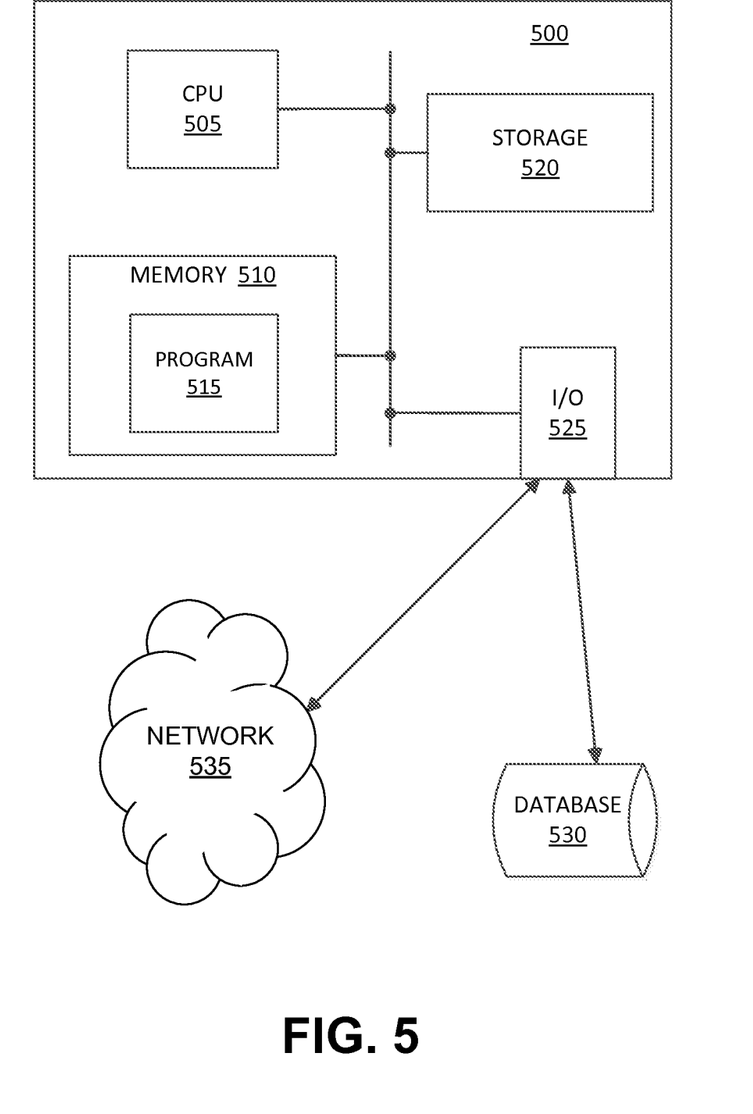
FIG. 5 is a block diagram of an example of a computing system that may be used to implement embodiments consistent with the principles of the invention.

FIG. 5 is a block diagram of an example of a computing system or data processing system 500 that may be used to implement embodiments consistent with this disclosure. Other components and/or arrangements may also be used. In some embodiments, computing system 500 may be used to implement, either partially or fully, various components of FIGS. 1-3, such as the computing system 110, the sounds engine 170, the clients 120 and the sound file generator 310. In some embodiments, computing system 500 may be used to implement in software or firmware, either partially or fully, process 400 of FIG. 4, among other things.

Computing system 500 includes a number of components, such as a central processing unit (CPU) or processor 505, a memory 510, an input/output (I/O) device(s) 525 and a nonvolatile storage device 520. System 500 can be implemented in various ways. For example, an implementation as an integrated platform (such as a server, workstation, personal computer, laptop computer, tablet computer, smart phone, etc.) may comprise CPU 505, memory 510, nonvolatile storage 520 and I/O devices 525. In such a configuration, components 505, 510, 520 and 525 may connect and communicate through a local data bus and may access a database 530 (implemented, for example, as a separate database system) via an external I/O connection. I/O component(s) 525 may connect to external devices through a direct communication link (e.g., a hardwired or local wifi connection), through a network, such as a local area network (LAN) or a wide area network (WAN), and/or through other suitable connections. System 500 may be standalone or it may be a subsystem of a larger system.

CPU 505 may be one or more known processors or processing devices, such as a microprocessor from the Core™ family manufactured by the Intel™ Corporation of Santa Clara, Calif. or a microprocessor from the FX™ family manufactured by the AMD™ Corporation of Sunnyvale, Calif. or the like. Memory 510 may be one or more fast storage devices, such as a solid-state storage device, configured to store instructions and information executed and used by CPU 505 to perform certain operations, functions, methods and processes related to embodiments of the present disclosure. Storage 520 may be a volatile or non-volatile, magnetic, semiconductor, tape, optical or other type of storage device or computer-readable medium, including devices such as CDs and DVDs, meant for long-term storage, which may be slower than the memory 510.

In the illustrated embodiment, memory 510 contains one or more programs, subprograms, or applications 515, which may have been loaded from storage 520 or from a remote system (not shown) and that, when executed by CPU 505, perform various operations, procedures, processes or methods consistent with the present disclosure. Alternatively, CPU 505 may execute one or more programs located remotely from system 500. For example, system 500 may access one or more remote programs via network 535 that, when executed, perform functions and processes related to embodiments of the present disclosure.

In various embodiments, memory 510 may include a program(s) 515 that is a local application or a web application for playing multiple sounds. In some embodiments, memory 510 may include a program 515 that implements at least a portion of process 400 of FIG. 4. In yet another embodiment, memory 510 may include a program 515 that implements at least a portion of the functionality of the system 100 described with respect to FIG. 1, at least a portion of the functionality described with respect to FIG. 2 and/or at least a portion of the functionality described with respect to FIG. 3. In some embodiments, memory 510 may also include other programs, applications or data that implement other methods and processes that provide ancillary functionality. For example, memory 510 may include programs or data used to access, receive, transmit, gather, organize, store, process and/or generate related data, such as the audio software 190 of FIG. 1, and the like.

Memory 510 may be also be configured with other programs (not shown) unrelated to this disclosure and/or an operating system (not shown) that performs several functions well known in the art when executed by CPU 505. By way of example, the operating system may be Microsoft Windows™, Unix™, Linux™, an Apple Computers™ operating system, a Personal Digital Assistant operating system such as Microsoft CE™ or other operating system. The choice of operating system, and even to the use of an operating system, is not critical to this disclosure.

I/O device(s) 525 may comprise one or more input/output devices that allow data to be received and/or transmitted by system 500. For example, I/O device 525 may include one or more input devices, such as a keyboard, touch screen, mouse, microphone, camera and the like, that enable data to be input from a user. Further, I/O device 525 may include one or more output devices, such as a display screen, CRT monitor, LCD monitor, plasma display, printer, audio hardware and drivers, speaker devices and the like, that enable data to be output or presented to a user. I/O device 525 may also include one or more digital and/or analog communication input/output devices that allow computing system 500 to communicate, for example, digitally, with other machines and devices. Other configurations and/or numbers of input and/or output devices may be incorporated in I/O device 525.

In the embodiment shown, system 500 is connected to a network 535 (such as the Internet, a private network, a virtual private network, network 140, or other network), which may in turn be connected to various systems and computing machines (not shown), such as servers, personal computers, laptop computers, smartphones, clients 120 and the like. In general, system 500 may input data from external machines and devices and output data to external machines and devices via network 535.

In the example of the embodiment shown in FIG. 5, database 530 is a standalone database external to system 500. In other embodiments, database 530 may be hosted by system 500. In various embodiments, database 530 may manage and store data used to implement systems and methods consistent with this disclosure. For example, database 530 may manage and store data structures that implement sound files and their metadata, and the like.

Database 530 may comprise one or more databases that store information and are accessed and/or managed through system 500. By way of example, database 530 may be a noSQL database, an Oracle™ database, a Sybase™ database or some other database. Systems and methods consistent with this disclosure, however, are not limited to separate data structures or databases, or even to the use of a formal database or data structure.

One of ordinary skill will recognize that the components and implementation details of the system in FIG. 5 are examples presented for conciseness and clarity of explanation. Other components and implementation details may be used.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for audio playback, the method comprising:
   performing, by one or more hardware processors:
      accessing a plurality of sound files of one or more sound types,
         wherein, for a given sound type of one or more sound types, the plurality of sound files includes a corresponding range of sound files of the given sound type, and
         wherein the corresponding range of sound files includes different sound files representing different quantities of instances of the given sound type;
      determining a desired number of instances of the given sound type to be played approximately simultaneously;
      selecting a group of sound files from among the corresponding range of sound files that include different sound files representing different quantities of instances of the given sound type,
         wherein a sum of the quantities of sound type instances of the corresponding range of sound files in the group approximates the desired number of instances of the given sound type to be played approximately simultaneously; and
      rendering the group of sound files on audio hardware or transmitting the group of sound files to a computing system.

2. The method of claim 1, wherein said selecting the group of sound files from the plurality of sound files comprises:
   sorting the plurality of sound files in descending order according to the quantity of the given sound type for each of the plurality of sound files;
   identifying a first sound file for the group of sound files based on the quantity of the first sound file being largest in the descending order to fit into the desired number of the given sound type;
   including the first sound file in the group of sound files;
   determining a difference between the desired number and the quantity of the first sound file; and
   if the difference is outside of a predetermined tolerance then identifying a second sound file for the group of sound files based on the quantity of the second sound file being largest in the descending order to fit into the difference.

3. The method of claim 1, wherein employing the plurality of sound files comprises:
   determining a maximum number of a sound processing channels constraint;
   determining a maximum number of instances of the given sound type constraint;
   generating a first sound file in the plurality of sound files, wherein the first sound file comprises a first quantity of the given sound type equal to or greater than the maximum number of instances of the given sound type constraint divided by the maximum number of sound processing channels constraint; and
   generating one or more additional sound files in the plurality of sound files, wherein each of the one or more additional sound files comprises some quantity of the given sound type that is less than the first quantity.

4. A system for audio playback, comprising:
a memory containing instructions; and
a processor, operably connected to the memory, that executes the instructions to perform operations comprising:
  determining, based at least on a number of sound processing channels available, a desired number of one or more sound types to be played approximately simultaneously;
  accessing a plurality of sound files of one or more sound types,
    wherein, for a given sound type of one or more sound types, the plurality of sound files includes a corresponding range of sound files of the given sound type, and
    wherein the corresponding range of sound files includes different sound files representing different quantities of instances of the given sound type;
  selecting a group of sound files from among the corresponding range of sound files that include different sound files representing different quantities of instances of the given sound type,
    wherein a sum of the quantities of sound type instances of the corresponding range of sound files in the group of sound files approximates the desired number of instances of the given sound type; and
  rendering the group of sound files on audio hardware or transmitting the group of sound files to a computing system.

5. The system of claim 4, the system further comprising at least one of:
  audio hardware, operably connected to the processor, that plays the group of sound files approximately simultaneously;
  network communication hardware, operably connected to the processor, that transmits the group of sound files to one or more remote computing systems; and
  a storage device, operably connected to the processor, that stores the group of sound files.

6. The system of claim 4, further comprising:
  determining a number of audio processing channels available to play the group of sound files;
  comparing the number of audio processing channels available to play the group of sound files to a number of files in the group of sound files; and
  if the number of available audio channels is less than the number of the plurality of sound files then:
    selecting a subgroup from the group of sound files that contains no more sound files than the number of available audio channels; and
    configuring the subgroup of sound files to be rendered.

7. The system of claim 4, wherein said selecting the group of sound files that approximate the desired number of the given sound type comprises:
  sorting a set of sound files in descending order according to the quantity of the given sound type for each of the set of sound files;
  identifying a first sound file from the set of sound files based on the quantity of the first sound file being largest in the descending order to fit into the desired number of the given sound type;
  including the first sound file in the group of sound files;
  determining a difference between the desired number and the quantity of the first sound file; and
  if the difference is outside of a predetermined tolerance then identifying a second sound file from the set of sound files based on the quantity of the second sound file being largest in the descending order to fit into the difference.

8. The system of claim 4, wherein said selecting the group of sound files that approximate the desired number of the given sound type comprises:
  determining that a sum of the quantities of the sound files in the group of sound files equals the desired number of the given sound type within a predetermined tolerance.

9. The system of claim 4,
  wherein said selecting the group of sound files that approximate the desired number of the given sound type comprises:
    limiting the number of sound files in the group of sound files so as not to exceed the number of audio processing channels available to play the plurality of sound files.

10. The system of claim 4, wherein said selecting the desired number of the given sound type to be played approximately simultaneously comprises:
  receiving, from at least one remote computing system, data requesting the given sound type to be played; and
  determining the desired number based on the data that was received.

11. The system of claim 4, wherein the operations further comprise:
  employing a set of sound files, each sound file of the set of sound files comprising the quantity of the given sound type configured to represent one or more instances of the given sound type occurring approximately simultaneously; and
  wherein determining the group of sound files that approximate the desired number of the given sound type comprises:
    selecting one or more sound files from the set of sound files to include in the group of sound files.

12. The system of claim 11, wherein employing a set of sound files comprises:
  determining a maximum number of sound processing channels constraint;
  determining a maximum number of the instances of the given sound type constraint;
  generating a first sound file in the set of sound files, wherein the first sound file comprises a first quantity of the given sound type equal to or greater than the maximum number of the instances of the given sound type constraint divided by the maximum number of sound processing channels constraint; and
  generating one or more additional sound files in the set of sound files, wherein each of the one or more additional sound files comprises a quantity of the given sound type that is less than the first quantity.

13. The system of claim 11, wherein employing a set of sound files comprises:
  generating the sound files in the set of sound files, wherein each sound file comprises a respective power-of-two quantity of the one or more sound.

14. A non-transitory computer-readable medium including instructions that, when executed by a processer, perform operations comprising:
  determining, for an interactive program, a desired number of one or more sound types to be played approximately simultaneously;
  accessing a plurality of sound files of one or more sound types, wherein, for a given sound type of one or more sound types, the plurality of sound files includes a corresponding range of sound files of the given sound type, and wherein the corresponding range of sound files includes different sound files representing different quantities of instances of the given sound type;

selecting a group of sound files from among the corresponding range of sound files that include different sound files representing different quantities of instances of the given sound type, wherein a sum of the quantities of sound type instances of the corresponding range of sound files in the group of sound files approximates the desired number of instances of the given sound type; and rendering the group of sound files on audio hardware or transmitting the group of sound files to a computing system.

15. The non-transitory computer-readable medium of claim 14, wherein the interactive program comprises one or more of: a video game; an online video game; a multi-player video game; a massively multi-player online video game; an interactive broadcast event; an interactive concert; an interactive movie; and an interactive television program.

16. The non-transitory computer-readable medium of claim 14, wherein said selecting the desired number of the given sound type to be played comprises:

receiving, from one or more users of the interactive program, data indicating one or more requests to play an instance of the given sound type;

counting the one or more requests received from the one or more participants to produce a total number of requests; and determining the desired number of the given sound type based at least in part on the total number of requests.

17. The non-transitory computer-readable medium of claim 14, wherein said transmitting comprises:

transmitting the group of sound files to one or more users of the interactive program.

18. The non-transitory computer-readable medium of claim 14, the operations further comprising:

determining, for each sound file in a set of sound files, the quantity of the given sound type to include in each sound file based on one or more of:

a first constraint on a maximum number of the instances of the given sound type that can occur approximately simultaneously in the interactive program, a second constraint on an amount of memory available to store the sound files, and a third constraint on a maximum number of sound processing channels available to play the sound files; and generating the set of sound files having the quantities that were determined; and wherein determining the group of sound files that approximate the desired number of the given sound type comprises selecting sound files from the set of sound files to include in the group of sound files.

19. The non-transitory computer-readable medium of claim 14, wherein the sound files are generated during a user pause in the interactive program.

* * * * *